(12) United States Patent
Prevost et al.

(10) Patent No.: US 7,665,667 B2
(45) Date of Patent: Feb. 23, 2010

(54) SYSTEM AND METHOD FOR UPDATING ACCESS CONTROL MECHANISMS

(75) Inventors: Sylvain Prevost, Austin, TX (US); Kapil Sachdeva, Austin, TX (US)

(73) Assignee: Gemalto Inc., Austin, TX (US)

( * ) Notice: Subject to any disclaimer, the term of this patent is extended or adjusted under 35 U.S.C. 154(b) by 683 days.

(21) Appl. No.: 11/241,340

(22) Filed: Sep. 30, 2005

(65) Prior Publication Data

US 2006/0076420 A1      Apr. 13, 2006

Related U.S. Application Data

(60) Provisional application No. 60/617,512, filed on Oct. 9, 2004.

(51) Int. Cl.
*G06K 19/06* (2006.01)
(52) U.S. Cl. .............................. 235/492; 380/35; 726/6; 726/18; 713/450
(58) Field of Classification Search ................. 235/492; 380/35; 726/6, 18; 713/150
See application file for complete search history.

(56) References Cited

U.S. PATENT DOCUMENTS

| 2004/0044906 | A1* | 3/2004 | England et al. ............. 713/200 |
| 2005/0181875 | A1* | 8/2005 | Hoehne et al. ................ 463/41 |
| 2006/0242404 | A1* | 10/2006 | Su ............................. 713/150 |
| 2007/0195803 | A1* | 8/2007 | Lowery et al. .............. 370/401 |
| 2007/0271602 | A1* | 11/2007 | Harrison ........................ 726/6 |
| 2008/0205640 | A1* | 8/2008 | Shen-Orr et al. ............. 380/35 |

* cited by examiner

*Primary Examiner*—Allyson N Trail
(74) *Attorney, Agent, or Firm*—The Jansson Firm; Pehr B. Jansson

(57) ABSTRACT

Updating the access control of a smart card at multiple points of the smart card life cycle. The system and method for updating the access control mechanisms during the smart card life cycle includes implementing an interface having a method for providing access control and a method for registering an access manager as an active access manager. In response to a request to register an access manager, the system and method executes the method for determining whether registering the access manager may be allowed.

11 Claims, 3 Drawing Sheets

SYSTEM AND METHOD FOR UPDATING ACCESS CONTROL MECHANISMS

CROSS-REFERENCE TO RELATED APPLICATIONS

This patent application is a non-provisional patent application claiming priority from provisional patent application Ser. No. 60/617,512, filed on Oct. 9, 2004, entitled "System and Method for Updating Access Control Mechanisms," the teachings of which are incorporated by reference herein as if reproduced in full below.

BACKGROUND OF THE INVENTION 1.0 Field of the Invention

The present invention relates generally to access control mechanisms for controlling the access to smart cards and more particularly to the secure update of the access control mechanisms for smart cards during the smart card life cycle.

2.0 Description of the Related Art

Smart cards are small personal computing devices that are used to protect very sensitive information. Smart cards may be used to perform banking functions, provide access to health records, personalization of computer network access, secure building access, and many more functions. Smart cards are also used as subscriber identity modules (SIM) in certain mobile telephony networks.

A crucial selling point of smart cards is the security of the data stored thereon or accessed through the use of smart cards. In many circumstances smart cards provide heightened levels of security than other security mechanisms because smart cards include a combination of security features. For example, to gain access to some data you need to know a password stored on the smart card and you must be in possession of the smart card. Other access control mechanisms include challenge-response schemes and biometric tests such as finger print verification.

A recent trend in smart card technology is so called multi-application smart cards. These cards may be programmed with multiple disjointed application programs. For example, the same card may be used to access both banking records as well as provide health care information. Examples of such cards include the Cyberflex family of cards from Axalto Inc.

A common feature of multi-application smart cards is that the application programs may be loaded onto the smart card after the card has been issued by the manufacturer or even after an end-user has taken possession of the card. Each such application program in a multi-application smart card is stored in some form of programmable memory on the smart card. Such post-manufacture programmability of smart cards provides increased flexibility and power of use of the smart cards.

Thus, because of the nature of smart cards, they have a product life cycle that includes several distinct phases. A first phase or series of steps is the manufacturing phase in which the integrated circuit is fabricated and mounted on the smart card as well as the system software loaded or stored on the smart card. A second phase is personalization phase in which the smart card is personalized to contain information unique to one person, the intended end-user of the smart card, such as cardholder name and cryptography keys for that cardholder. A third phase is the issuance phase in which the smart card is deployed. Finally, a fourth phase is usage phase in which the cardholder uses the smart card for one or more purposes, such as for banking or as a Subscriber Identity Module (SIM) in a GSM mobile telephone system.

Each phase in the smart card life cycle may have unique needs in terms of access control. For example, at the manufacturing phase there may not be a need for as high a level of security because at that phase neither personal information nor other sensitive application programs have been loaded onto the smart card and smart cards are manufactured in a controlled environment. Thus, to gain access to the smart card during manufacturing may only require a very simple access control mechanism. However, once personal information has been loaded onto the smart card, a higher level of access control may be required. Furthermore, in a multi-application smart card, the smart cards usage may change even during the usage phase. For example, a card that was originally issued for some banking purpose, e.g., an electronic purse for small value transactions, could be re-programmed to also include a health care information application containing very sensitive and personal information about the card holders health history. The former of these applications would not merit a particularly sophisticated access control scheme, perhaps PIN would suffice, whereas the health care information application may require a very secure access control mechanism, e.g., a biometric scheme such as fingerprint verification.

Co-pending patent application Ser. No. 10/285,654 to Apostol Vassilev, et al., entitled "Authentication Framework for Smart Cards", filed on Oct. 31, 2002 and co-assigned with the present invention, describes an authentication framework in which authentication technology applications are separated from functional card applications, thereby allowing the authentication technology applications to be modified or replaced independently from the card applications. The co-pending patent application '654 allows the application level to select or update the authentication policy without requiring updates to the applications themselves.

A problem with the known prior art access control mechanisms is that these schemes do not allow for controlled update of the access control mechanisms during the smart card life cycle. Accordingly, from the foregoing it is apparent that there is a hitherto unresolved need for a system and methodology for permitting the secure update of the access control mechanism of a smart card during the smart card life cycle.

DETAILED DESCRIPTION OF THE INVENTION

Figure 1:
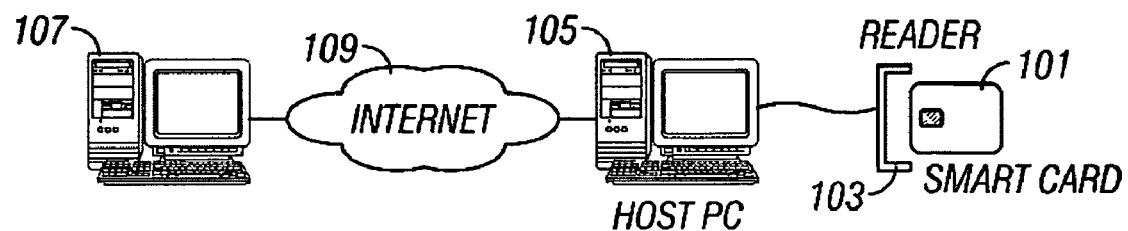
FIG. 1 is a schematic illustration of the operating environment in which a smart card according to the invention may be used to provide secure computing services.

In the following detailed description and in the several figures of the drawings, like elements are identified with like reference numerals.

As shown in the drawings for purposes of illustration, the invention is embodied in a system and method for providing an access control mechanism for smart cards in which the access control mechanism may be updated securely during the smart card life cycle such that different access control schemes may be used during different phases of the life cycle according to what level of access control is appropriate for a particular phase or use of the smart card.

FIG. 1 is a schematic illustration of the operating environment in which a resource-constrained device according to the invention may be used to provide secure communication with a remote entity. A resource-constrained device 101, for example, a smart card, is connected to a computer network 109, for example, the Internet. The resource-constrained device 101 may be connected to the computer network 109 via a personal computer 105 that has attached thereto a card reader 103 for accepting a smart card. However, the resource-constrained device 101 may be connected in a myriad of other ways to the computer network 104, for example, via wireless communication networks, smart card hubs, or directly to the computer network 109. The remote node 105 is a computer system of some sort capable to implement some functionality that may either seek access to information on the smart card 101 or to which the smart card user may seek access. For example, the remote node 107 may be executing banking software that a user of the smart card 101 is seeking to obtain access to. The smart card 101 may then provide some access control functionality or may even be an electronic purse to which funds are downloaded from the remote computer.

The scenario of FIG. 1 is presented here merely for the purpose of providing an example and must not be taken to limit the scope of the invention whatsoever. Only the imagination of designers limits the myriad of possible deployment scenarios and uses for smart cards.

Figure 2:
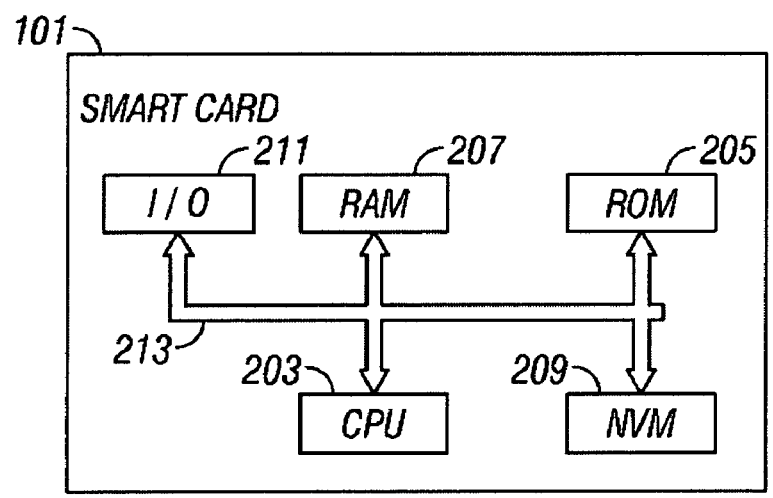
FIG. 2 is a schematic illustration of an exemplary architecture of a resource-constrained device.

FIG. 2 is a schematic illustration of an exemplary architecture of a resource-constrained device 101. The resource-constrained device 101, e.g., a smart card has a central processing unit 203, a read-only memory (ROM) 205, a random access memory (RAM) 207, a non-volatile memory (NVM) 209, and a communications interface 211 for receiving input and placing output to a device, e.g., the card reader 102, to which the resource-constrained device 101 is connected. These various components are connected to one another, for example, by bus 213. In one embodiment of the invention, the SSL/TLS module 103, as well as other software modules shown in FIG. 1, would be stored on the resource-constrained device 101 in the ROM 206. During operation, the CPU 203 operates according to instructions in the various software modules stored in the ROM 205.

Figure 3:
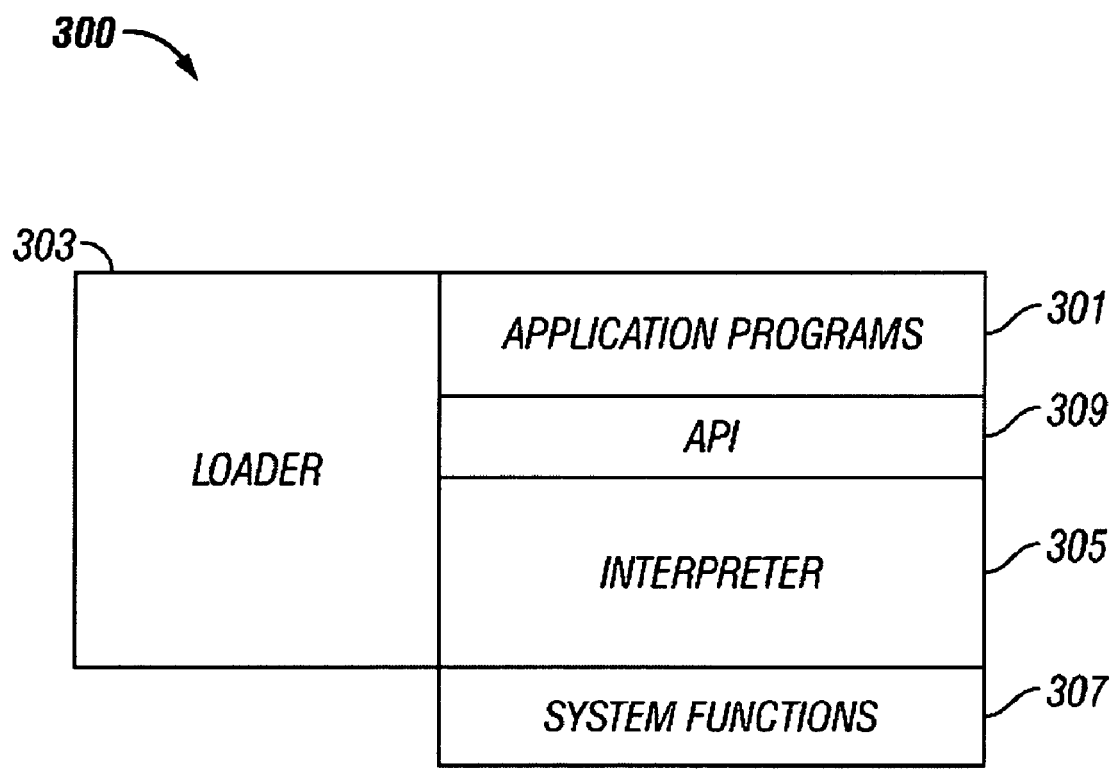
FIG. 3 is a schematic illustration of a software architecture for a resource-constrained device.

FIG. 3 is a block diagram of an exemplary software architecture 300 that one may find implemented on a smart card 101. The software architecture 300 includes several application programs 301. These are loaded onto the smart card by a loader 303. The application programs 301 would typically be loaded into the non-volatile memory 209. However, in other scenarios an application program may be permanently written onto the smart card at manufacture by having it stored in the ROM 205. If the smart card 101 were called upon to execute a program for only one session, it would be possible to have the program loaded in the RAM 207. However, that would be a rare circumstance. On the other hand, during execution of an application program, it is indeed possible that certain portions of the application program are loaded into the RAM 207.

In this example, several application programs 301 are executed by the CPU 203 under the control of instructions of an interpreter 305. The interpreter 303 may, for example, be a Javacard Virtual Machine as found on the Cyberflex smart card family from Axalto Inc. of Austin, Tex. In alternative embodiments, the application programs 301 are compiled into executable code and do not require further interpretation by the interpreter 305. However, in such embodiments, the job control would be managed by some operating system program that would take the place of the interpreter 303.

The interpreter 303 is usually a static component of a smart card 101 and would therefore be loaded into the ROM 205. The interpreter 303 may also be burned into some form of firmware. In another alternative the interpreter 303 may be stored in the non-volatile memory 209.

In most embodiments of the invention, the smart card software architecture 300 also includes some system functions 307. System functions 307 may include security functionality, cryptography functionality, and utility libraries that may be called by application programs 301.

The application programs 301 may access functions provided by the smart card system software 307 by issuing calls through an application program interface 309.

Figure 4:
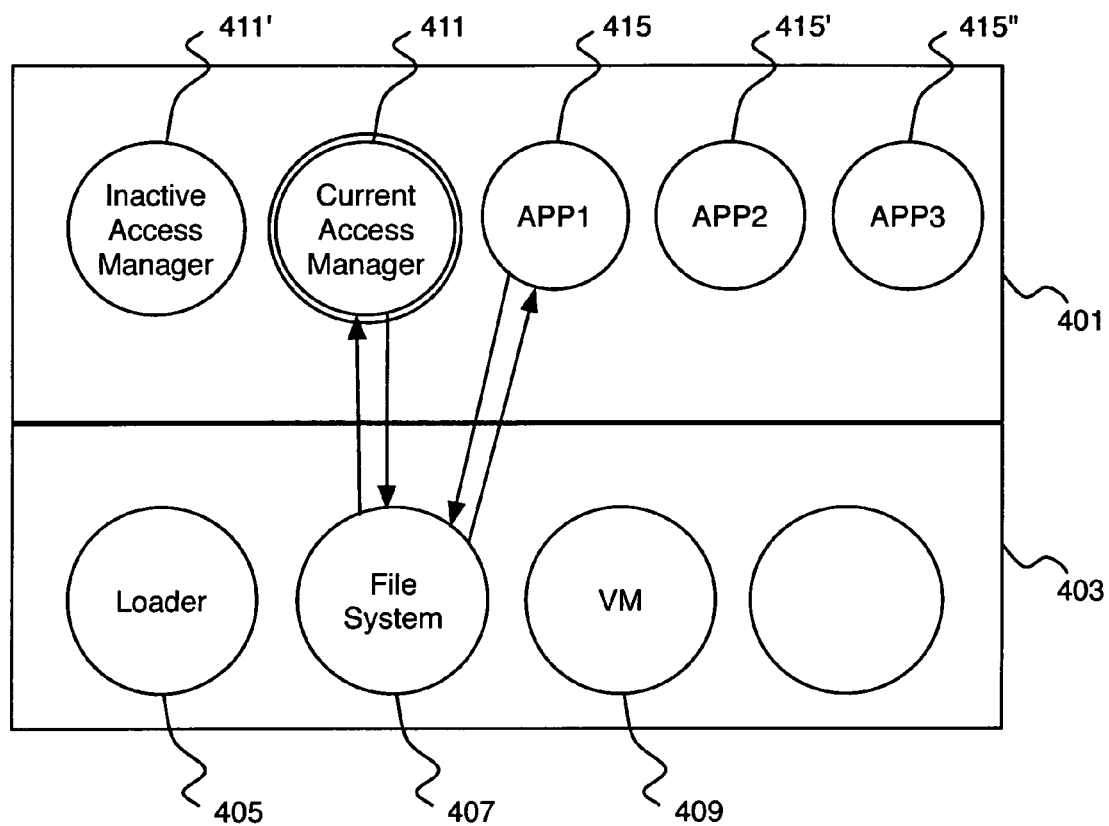
FIG. 4 is a schematic illustration of a software architecture according to the invention in which one application program as illustrated in FIG. 3 is an access control manager according to the invention.

According to the invention, access control for a smart card 101 according to the invention is provided by an access control manager that implements an access control manager interface (described in greater detail herein below). FIG. 4 is an alternative software architecture for a smart card. In this architecture the software for the smart card are divided into application programs 401 and system functions 403. Generally, application programs may be loaded onto the smart card at any time during the life cycle, e.g., during issuance or even during the usage phase. The system functions 403 contain programs that control system functionality of the smart card. For example, the system functions include a loader 405 that operates to load new application programs onto the smart card, a file system 407 for managing data files stored on the smart card, and a virtual machine 409 for executing the application programs 403. Of course, the various application programs 401 and system programs 403 are interconnected, e.g., so that an application program 401 may call upon the file system 407 to access data and so on, however, those connections are not shown in the FIG. 4 except where useful to illustrate the present invention.

One application program 401 is the current access control manager 411. When another application program or a system function requires access to a resource of the smart card, that application program calls upon the access manager 401 to determine whether the application program or system function should allow or deny access to the resource. For example, an application program 415 may wish to access a particular file in the file system 407. Upon receiving that request, the file system 407 calls the current access control manager 411 to determine whether access to the particular file should be allowed or denied.

Being an application program 401 the access control manager 411 may be loaded onto the smart card using the loader 405. In a re-programmable multi-application smart card, application programs 401 may be added, modified or deleted at any time during the smart card life cycle. Thus, by providing access control through an application program 401, e.g., access control manager 411, the access control for the smart card may be modified at any phase during the life cycle of the smart card.

However, there would be obvious risks with allowing unrestricted replacement of the access control mechanism for a smart card. According to the invention the replacement of the access control mechanism is controlled by having the current access control manager define the subsequent access control manager. Thus, any access manager according to the invention implements at least two functions, namely, the access control function and a function to allow or disallow its own replacement.

In one embodiment of the invention, an interface called the IaccessManager interface is defined as follows:

TABLE 1

IAccessManager Interface

```
1    namespace netCard.CardLibrary
2    {
3    public interface IAccessManager
4    {
5        //    GrantAccess: System resource access request to
5        //        the active access manager
         //    param path is the resource path name
6        //    param accessmode is the type of access desired
7              void GrantAccess (string path, int accessMode);
8        //    RegisterAccessManager: System request to the
         //        current active access manager in order to
         //        activate a new access manager server.
         //    param URI: Universal Resource Identifier for
the
         //        access manager server proposed to replace
         //        the current access manager server
         //    param accessMode: path of the assembly of the
         //        access manager server proposed to replace
         //        the current access manager server
               void RegisterAccessManager (string uri,
                   string application Path);
```

In this embodiment of the invention, each access control manager 411, i.e., any application that seeks to become an access manager on the smart card, implements the IAccessManager Interface, specifically, the application implements the two methods specified by the IAccessManager Interface: GrantAccess and RegisterAccessManager.

Consider the following example. As discussed above, two phases of the smart card life cycle include personalization and usage. Let's suppose, for the purpose of providing an example, the personalization phase access manager may be implemented as shown in Table 2:

TABLE 2

Example Perso Access Manager

```
1     public class PersoAccessManager : IAccessManager{
2     public void DoLogin(...){ // challenge-response }
3     public void GrantAccess(string resource,int
          accessMode){
4         if(resource == app && accessMode ==
              app_download){
5             if(authenticated)
6                 allow
7             else
8                 deny
9         }
10        else if (resource == fileA && accessMode ==
delete){
11            if (username = "Jack Crouch" &&
                  authenticated)
12                allow
13            else
14                deny
15        }
16        ***
17        else
18            allow
19    }
20    public void RegisterAccessManager(string uri,string
21        appPath)
22    {
23        if(authenticated){
24        if(uri == "VENDOR_A_ACCESSMANAGER_APP")
25            allow
26        else
27            deny
28        }
29    }
```

In the code of Table 2, the PersoAccessManager class is defined as an implementation of the IAccessManager interface, Line 1. The PersoAccessManager implements the two methods defined by the IAccessManager interface, namely, GrantAccess ( ) (Lines 3-19) and RegisterAccessManager ( ) (Lines 20-29). While not specifically required as part of the implementation of the IAccessManager interface, usually a card would require some method for authenticating a user. This could be achieved by a login procedure defined in the Access Manager implementation. In the case of the PersoAccessManager, thee authentication is performed by the DoLogin ( ) method (Line 2), the details of which are unimportant to the present invention.

The PersoAccessManager implementation of GrantAccess( ) provides for access control to two specific resources and types of access sought for each of these resources. Specifically, the PersoAccessManger specifies an access control for application download (Lines 4 through 9) and for the deletion of a particular file (Lines 10-15). The GrantAccess method receives as argument the resource that is being accessed and the access mode. In this particular implementation of GrantAccess, a sequence of if . . . else if . . . else statements (Lines 4, 10, and 17) are used to determine if access is attempted to any of the resources under access control by the GrantAccess routine. If so, the particular access control for that resource/accessmode is checked, e.g., Lines 5-8 and Lines 11-14, respectively. In this particular case, for all other access, access is allowed, Line 18. In an alternative, the default would be to deny access.

If an entity wishes to replace the access manager on a smart card 101, the entity would first load the alternative access manager onto the smart card using loader 405. The entity would then call upon the RegisterAccessManager ( ) method of the current access manager 411 with the Universal Resource Identifier (URI) of the proposed new access manager, e.g., InactiveAccessManager 411'. The RegisterAccessManager determines if the entity attempting to replace the access manager has been authenticated (Line 14). If the entity has been authenticated, the RegisterAccessManager method determines if the proposed new access manager (as identified by its URI) corresponds to the expected next access manager. If so the replacement is allowed (Line 16), otherwise, the replacement is denied (Line 18).

Thus, the PersoAccessManager defines both the access control for allowing applications to be updated (GrantAccess—Lines 1-19) and defines or controls which application may replace it (RegisterAccessManager—Lines 20-29).

To continue with this example, consider the possibility that after the card has concluded the personalization phase in which the PersoAccessManager (Table 2) has been registered as the access manager 401, the card moves on to being issued, i.e., the issuance phase, by a vendor. That vendor may require a different access control for permitting additional applications to be added to the smart card. The vendor may then attempt to replace the access manager 401 with a new access manager that provides the required access control protocol. Table 3 provides an example of such an alternative access manager:

TABLE 3

Vendor Access Manager

```
1    public class VendorAccessManager : IAccessManager{
2    public void DoLogin(...){ // username-password &
role }
3        public void GrantAccess(string resource,
             int accessMode){
```

TABLE 3-continued

Vendor Access Manager

```
4         if (resource == app &&
              accessMode == app_download){
5             if(username=="jbrist" is authenticated)
6                 allow
7             else
8                 deny
9         }
10    }
11    public void RegisterAccessManager(string uri,
                  string appPath)
12    {
13        if(admin is authenticated){
14            if(uri == "VENDOR_B_ACCESSMANAGER_APP")
15                allow
16            else
17                deny
18        }
19    }
```

When the vendor wishes to replace the access manager of Table 2 with the access manager of Table 3, VendorAccessManager, the loader calls upon the RegisterAccessManager ( ) method of the PersoAccessManager (Table 2) to register the VendorAccessManager. The RegisterAccessManager( ) function knows the URI to expect for the next access manager, "VENDOR_A_ACCESSMANAGER_APP" Table 2, Line 24. Thus, if the URI of VendorAccessManager corresponds to the URI that is expected (Line 24), the RegisterAccessManager ( ) allows the new access manager to be registered as the current access manager, otherwise, the registration attempt is denied.

As illustrated in FIG. 4, more than one access manager may be loaded on a smart card 101 at any one time. For example, both inactive access manager 411' and current access manager 411 are loaded onto the smart card in the example of FIG. 4. Other than space limitations, there is no limit on how many access managers may be loaded at any one time. The RegisterAccessManager ( ) method of the current access manager 411' is used to activate an inactive access manager and make it into an active access manager. In the preferred embodiment, registering an access manager causes the access manager being activated to replace the current access manager. In the example of FIG. 4, if the current access manager 411 is called upon to register the Inactive Access Manager 411', upon success of that operation the Inactive Access Manager 411' is activated and replaced the current access manager 411 as the current access manager.

Furthermore, while the preferred embodiment contemplates having only one access manager active at one time, that is not a required limitation of the present invention. In alternative embodiments, multiple access managers are con-currently active. These con-currently active access managers may serve to provide access control for different sets of resources or for differing sets of conditions. For example, there may be one access manager that manages all file system access control and another access manager that manages loading of new applications. Alternatively, the con-currently active access managers may be triggered depending on which actor is seeking to access a resource.

Smart cards are often employed in a context of a framework. Examples of frameworks include Globalplatform (GlobalPlatform, Open Platform, Card Specification Version 2.1 (June 2001), www.globalplatform.org) and the Global System for Mobile Communications (GSM). In each such framework the smart cards fill some role in a larger system. One aspect of a framework in which programmable smart cards are employed is how applications are loaded onto the smart card and how applications are modified on the smart card. By employing the present invention in which the access control mechanism that controls the loading of applications onto a smart card it is possible to alter in which framework a particular smart card is employed. For example, if a particular smart card has been loaded with an access control manager that follows the access control specified by GSM and which implements the IAccessManager interface, that access control manager may be replaced with an access control manager that adheres to the access control mechanism specified by the GlobalPlatform framework, thereby making it possible to make the smart card that was previously employed as a GSM SIM card available for use as a GlobalPlatform smart card.

Although specific embodiments of the invention has been described and illustrated, the invention is not to be limited to the specific forms or arrangements of parts so described and illustrated. For example, the invention, while described in the context of smart cards for illustrative purposes, is applicable to other computing devices. The invention is limited only by the claims.

We claim:

1. A method of updating an access control of a smart card at multiple points of the smart card life cycle, comprising:
   a computer readable storage medium containing instructions in the form of an access manager implementing an interface having a method for providing access control and a method for registering a new access manager the access control manager having instructions to cause a central processor of the smart card to:
       in response to a request to replace a current access manager with a new access manager, executing the method for registering a new access manager, thereby replacing the current access manager with the new access manager.

2. The method of claim 1, wherein the step of executing the method for registering a new access manager comprises:
   determining whether an entity seeking to replace the access manager has been authorized to replace the access manager.

3. The method of claim 1, wherein the step of replacing the current access manager of a smart card is executed at a point in the smart card life cycle selected from a set including manufacture of the smart card, initialization of the smart card, personalization of the smart card, issuance of the smart card, loading of additional applications onto the smart card, updating an application on the smart card.

4. The method of claim 1 wherein the interface specifies arguments for the method to register a new access manager to allow the method to identify whether the new access manager is an access manager that may replace the current access manager.

5. A multi-application smart card in which an access control for the smart card may be updated at any of several points of a life cycle of the smart card, comprising:
   a memory having instructions for causing a central processor to perform certain tasks, the instructions including:
       at least one application program loaded onto the smart card;
       an access manager for providing access control to the smart card wherein an access control logic implements an access manager interface having a method for access control and a method for registering a new access control manager.

6. The multi-application smart card of claim 5, wherein the access control logic performs an access control protocol specified for a particular point in the smart card life cycle.

7. The multi-application smart card of claim 5, wherein the method for registering a new access control manager operates to determine whether an entity seeking to replace the access control for the smart card has been authorized to replace the access control for the smart card.

8. A method of updating an access control of a smart card at multiple points of the smart card life cycle, comprising:
   a computer readable storage medium containing instructions in the form of an access control manager
   implementing an interface having a method for providing access control and a method for registering an access manager as an active access manager the access control manager having instructions to cause a central processor of the smart card to:
      in response to a request to register an access manager, executing the method for determining whether registering the access manager may be allowed.

9. The method of claim 8, wherein the step of executing the method for registering an access manager comprises:
   determining whether an entity seeking to replace the access manager has been authorized to register the access manager.

10. The method of claim 8, wherein the step of registering an access manager of a smart card is executed at a point in the smart card life cycle selected from a set including manufacture of the smart card, initialization of the smart card, personalization of the smart card, issuance of the smart card, loading of additional applications onto the smart card, updating an application on the smart card.

11. The method of claim 8 wherein the interface specifies arguments that may allow the method for registering an access manager to determine whether the access manager is an access manager that may be registered as an active access manager.

* * * * *